(12) United States Patent
Williams, Jr. et al.

(10) Patent No.: US 11,759,061 B2
(45) Date of Patent: Sep. 19, 2023

(54) DYNAMIC PRODUCT USE REPORTING SYSTEM

(71) Applicant: Kimberly-Clark Worldwide, Inc., Neenah, WI (US)

(72) Inventors: Frederick J. Williams, Jr., Cumming, GA (US); Stephen Becker, Cumming, GA (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 106 days.

(21) Appl. No.: 17/396,564

(22) Filed: Aug. 6, 2021

(65) Prior Publication Data

US 2022/0022704 A1 Jan. 27, 2022

Related U.S. Application Data (62) Division of application No. 16/062,061, filed as application No. PCT/US2015/066411 on Dec. 17, 2015, now Pat. No. 11,109,721.

(51) Int. Cl.
| | |
|---|---|
| *A47K 10/32* | (2006.01) |
| *B65D 85/67* | (2006.01) |
| *A47K 10/24* | (2006.01) |
| *A47K 10/38* | (2006.01) |
| *B65D 25/00* | (2006.01) |
| *B65D 83/08* | (2006.01) |
| *A47K 10/36* | (2006.01) |
| *G07F 9/02* | (2006.01) |
| *G06F 9/54* | (2006.01) |
| *G06F 11/30* | (2006.01) |

(52) U.S. Cl.
CPC .............. *A47K 10/32* (2013.01); *A47K 10/24* (2013.01); *A47K 10/3687* (2013.01); *A47K 10/38* (2013.01); *B65D 25/00* (2013.01); *B65D 83/08* (2013.01); *B65D 85/67* (2013.01); *G06F 9/542* (2013.01); *G06F 11/3065* (2013.01); *G07F 9/026* (2013.01); *A47K 2010/3226* (2013.01); *A47K 2010/3253* (2013.01)

(58) Field of Classification Search
CPC ................ A47K 10/3687; A47K 10/36; A47K 10/3612; A47K 10/3625; A47K 10/3656; A47K 10/3827; A47K 10/24; A47K 10/38; A47K 10/3226; A47K 10/3253; B65D 25/00; B65D 83/08; B65D 85/67; G06F 9/542; G06F 11/3065; G06F 9/026
USPC .................... 221/63; 34/90; 700/240; 254/14
See application file for complete search history.

(56) References Cited

U.S. PATENT DOCUMENTS

| | | | |
|---|---|---|---|
| 2,930,664 A | 3/1960 | Liebisch | |
| 3,004,650 A | 10/1961 | Pettee | |
| 3,007,650 A * | 11/1961 | Burton | ............... A47K 10/3687 312/34.19 |

(Continued)

FOREIGN PATENT DOCUMENTS

| | | |
|---|---|---|
| CA | 2269483 A1 | 10/2000 |
| CN | 102458202 A | 5/2012 |

(Continued)

*Primary Examiner* — Rakesh Kumar (57) ABSTRACT

Methods, systems and apparatus for dynamically adjusting product use reporting schedules for dispensers to increase or decrease the frequency of such reports based on expected product use such as a date the dispenser is expected to be depleted.

9 Claims, 4 Drawing Sheets

(56) References Cited

U.S. PATENT DOCUMENTS

| | | | | |
|---|---|---|---|---|
| 3,050,224 A * | 8/1962 | Drolshammer | A47K 10/38 | 225/88 |
| 3,126,234 A * | 3/1964 | Batlas | A47K 10/32 | 242/596.7 |
| 3,276,706 A * | 10/1966 | House | A47K 10/38 | 226/110 |
| 3,288,387 A * | 11/1966 | Craven, Jr. | A47K 10/3687 | 242/560.1 |
| 3,628,743 A * | 12/1971 | Bastian | A47K 10/32 | 242/560.1 |
| 3,917,191 A * | 11/1975 | Graham, Jr. | A47K 10/3687 | 242/596.4 |
| 4,010,909 A * | 3/1977 | Bastian | A47K 10/3687 | 226/91 |
| 4,067,509 A * | 1/1978 | Graham, Jr. | A47K 10/36 | 242/560.1 |
| 4,137,805 A * | 2/1979 | DeLuca | A47K 10/3687 | 226/110 |
| 4,148,442 A * | 4/1979 | Baumann | A47K 10/3687 | 242/560.1 |
| 4,165,138 A * | 8/1979 | Hedge | A47K 10/3656 | 242/564.4 |
| 4,264,403 A * | 4/1981 | Emmel | B65C 11/00 | 156/154 |
| 4,307,638 A * | 12/1981 | DeLuca | A47K 10/3643 | 83/345 |
| 4,317,547 A * | 3/1982 | Graham, Jr. | A47K 10/3687 | 242/560.1 |
| 4,358,169 A * | 11/1982 | Filipowicz | A47K 10/3637 | 225/8 |
| 4,367,666 A * | 1/1983 | Toth | B65H 35/08 | 83/272 |
| 4,378,912 A * | 4/1983 | Perrin | A47K 10/3637 | 226/91 |
| 4,487,375 A * | 12/1984 | Rasmussen | A47K 10/36 | 226/174 |
| 4,552,315 A * | 11/1985 | Granger | A47K 10/3643 | 242/560.3 |
| 4,691,503 A * | 9/1987 | Frerich | B65B 41/12 | 53/118 |
| 4,756,485 A * | 7/1988 | Bastian | A47K 10/3687 | 242/560.1 |
| 4,846,412 A * | 7/1989 | Morand | A47K 10/3687 | 225/106 |
| 4,872,592 A | 10/1989 | Anazawa | | |
| 4,882,568 A | 11/1989 | Kyser et al. | | |
| 4,999,611 A | 3/1991 | Zehnder | | |
| 5,161,723 A * | 11/1992 | Wirtz-Odenthal | A47K 10/3687 | 225/14 |
| 5,244,161 A * | 9/1993 | Wirtz-Odenthal | A47K 10/3687 | 242/563.2 |
| 5,271,574 A * | 12/1993 | Formon | A47K 10/36 | 242/560.3 |
| 5,294,192 A * | 3/1994 | Omdoll | A47K 10/3687 | 242/564.4 |
| 5,400,982 A * | 3/1995 | Collins | A47K 10/36 | 242/564.4 |
| 5,604,992 A * | 2/1997 | Robinson | A47K 10/485 | 242/560 |
| 5,625,908 A | 5/1997 | Shaw | | |
| 5,878,381 A | 3/1999 | Gemmell et al. | | |
| 5,954,256 A * | 9/1999 | Niada | A47K 10/3836 | 242/598.6 |
| 6,145,779 A * | 11/2000 | Johnson | A47K 10/3687 | 242/564.2 |
| 6,152,397 A * | 11/2000 | Purcell | A47K 10/3687 | 242/563.2 |
| 6,224,010 B1 * | 5/2001 | Morand | A47K 10/3687 | 242/564.2 |
| 6,360,181 B1 | 3/2002 | Gemmell et al. | | |
| 6,426,701 B1 | 7/2002 | Levy et al. | | |
| 6,736,348 B1 * | 5/2004 | Formon | A47K 10/3687 | 242/563 |
| 7,354,015 B2 * | 4/2008 | Byrd | A47K 10/36 | 242/563 |
| 7,726,599 B2 | 6/2010 | Lewis et al. | | |
| 7,783,380 B2 | 8/2010 | York et al. | | |
| 7,841,556 B2 * | 11/2010 | Elliott | A47K 10/3687 | 242/564.2 |
| 7,878,444 B2 * | 2/2011 | Friesen | A47K 10/3687 | 242/561 |
| 8,086,115 B2 | 12/2011 | Yamasaki et al. | | |
| 8,282,033 B2 * | 10/2012 | Achton | A47K 10/3643 | 242/560.1 |
| 8,599,007 B2 | 12/2013 | Larsson et al. | | |
| 8,610,536 B2 * | 12/2013 | Libby | G07F 13/025 | 340/541 |
| 8,616,489 B2 | 12/2013 | Goeking et al. | | |
| 8,694,156 B2 | 4/2014 | Nallappan et al. | | |
| 8,807,475 B2 | 8/2014 | Rodrian et al. | | |
| 9,701,508 B2 | 7/2017 | Diamond | | |
| 9,999,326 B2 | 6/2018 | Borke et al. | | |
| 10,123,666 B2 | 11/2018 | Ruthven et al. | | |
| 10,149,579 B2 | 12/2018 | Goltz et al. | | |
| 10,285,545 B2 | 5/2019 | Ruthven et al. | | |
| 2002/0175182 A1 | 11/2002 | Matthews | | |
| 2003/0078691 A1 | 4/2003 | Holt et al. | | |
| 2004/0134924 A1 | 7/2004 | Hansen et al. | | |
| 2005/0171634 A1 | 8/2005 | York et al. | | |
| 2006/0032862 A1 * | 2/2006 | Miller | B67D 7/22 | 222/64 |
| 2007/0010389 A1 * | 1/2007 | Cutrona | A47K 10/3643 | 83/337 |
| 2010/0044407 A1 * | 2/2010 | Yardley | B65H 35/0006 | 225/14 |
| 2011/0114782 A1 | 5/2011 | Rodrian et al. | | |
| 2013/0099924 A1 | 4/2013 | Larsson et al. | | |
| 2013/0184858 A1 | 7/2013 | Nallappan et al. | | |
| 2017/0057775 A1 | 3/2017 | Kobs et al. | | |
| 2017/0290472 A1 | 10/2017 | Borke et al. | | |
| 2017/0290473 A1 | 10/2017 | Borke et al. | | |
| 2018/0064297 A1 | 3/2018 | Goeking et al. | | |
| 2018/0368626 A1 | 12/2018 | Williams, Jr. et al. | | |

FOREIGN PATENT DOCUMENTS

| | | | | |
|---|---|---|---|---|
| CN | 202445976 U | | 9/2012 | |
| CN | 104161481 A | | 11/2014 | |
| DE | 20016735 U1 | | 1/2001 | |
| EP | 2068130 A2 * | | 6/2009 | B05B 11/308 |
| EP | 2068130 A2 | | 6/2009 | |
| JP | 2003098265 A | | 4/2003 | |
| JP | 2010233971 A * | | 10/2010 | |
| JP | 2010233971 A | | 10/2010 | |
| WO | 9427489 A1 | | 12/1994 | |
| WO | 2007068270 A1 | | 6/2007 | |
| WO | WO-2010129741 A2 * | | 11/2010 | A47K 10/26 |

* cited by examiner

DYNAMIC PRODUCT USE REPORTING SYSTEM

The present application is a divisional application of and claims priority to and benefit of U.S. patent application Ser. No. 16/062,061, filed on 14 Jun. 2018, which claims priority to and benefit of PCT/US15/66411, filed on 17 Dec. 2015, the contents of which are all incorporated herein by reference.

BACKGROUND

This disclosure relates to dynamically determining product use reporting schedules and predicting product use.

Systems dispensing consumable products are ubiquitous in many environments today. For example, rolled hand towel dispensers are commonplace in many semi-private and public washrooms and break rooms. Monitoring and refilling such dispensers can be a time consuming and laborious endeavor requiring, in some scenarios, that an attendant or building maintenance team member check the dispensers on a set schedule and refill as needed. This process may result in checking the dispenser and determining that (1) no refill is require, resulting in an unnecessary visit to the dispenser, which leads to building management inefficiencies and additional costs, or (2) the dispenser is empty, resulting in frustrated users.

SUMMARY

In general, the subject matter of this specification relates to dynamically determining product use reporting schedules for dispensers and predicting product use for more efficient dispenser use and maintenance. In general, one aspect of the subject matter described in this specification can be implemented in systems that include a product dispenser comprising a housing comprising (i) a primary roll holder configured to hold a first roll and (ii) a stub roll holder configured to hold the first roll as a second roll when an amount remaining of the first roll is in a threshold range; a dispensing mechanism coupled to the housing and configured to dispense from the stub roll holder until the second roll is depleted and thereafter dispense from the primary roll holder; a dispenser counter configured to count a number of combined dispenses of the first and second rolls; and a data communication device configured to transmit the number of combined dispenses. A data processing system configured to receive the number of combined dispenses from the data communication device; determine available dispenses of the second roll based on the number of combined dispenses and a maximum number of dispenses of the first roll; and determine an expected depletion date of the first and second rolls based on the number of combined dispenses, the available dispenses of the second roll and the maximum number of dispenses of the first roll. Other embodiments of this aspect include corresponding methods, apparatus, and computer program products.

Yet another aspect of the subject matter described in this specification can be implemented in methods that include receiving a refill alert indicating that a product dispenser is being refilled with a first roll in a primary roll holder; determining a stub roll size based on a number of dispenses of the product dispenser between a time of the refill alert and a time of a low product alert indicating that the amount of the first roll is in a threshold range; setting a size of a second roll in a stub roll holder as the stub roll size, wherein the first roll is the second roll when moved to the stub roll holder; determining an expected depletion date for the first and second rolls based on the stub roll size and a size of the first roll in the primary roll holder; receiving reports of the numbers of dispenses of the product dispenser according to a reporting schedule; adjusting the expected depletion date based on the reports of the numbers of dispenses; and adjusting the reporting schedule to increase the frequency of reports in response to determining that the numbers of dispenses exceeds a threshold. Other embodiments of this aspect include corresponding systems, apparatus, and computer program products.

In some implementations, the methods, systems, apparatus, and computer program products described herein have the following features, including determining an estimated dispensing profile over time based on the number of combined dispenses, where the data communication device is configured to transmit the number of combined dispenses according to a reporting schedule and to change the reporting schedule based on at least one of the estimated dispensing profile and the expected depletion date, and the data communication device is configured to receive the changed reporting schedule from the data processing device and to transmit the number of combined dispenses according to the changed reporting schedule.

The changed reporting schedule is changed to require more frequent reporting intervals as at least one of the estimated dispensing profile and the expected depletion date indicate that the first roll is nearing depletion and/or changed to account for a maintenance schedule defining when maintenance visits are planned for the product dispenser.

The data processing system is configured to store an initial estimated dispensing profile defining the time-varying dispensing rate of one or more of the first and second rolls over a set period, and the data processing system is configured to update the initial estimated dispensing profile based on the number of combined dispenses. The threshold range defines a maximum amount of the first roll that can be held by the stub roll holder. The product dispenser comprises a refill detector configured to determine when the first roll is replaced and is in a washroom and the first and second rolls are hand towel rolls.

The expected depletion date is adjusted based on monitoring foot traffic in an area of the product dispenser. The adjusted reporting schedule is accessed by (and/or provided to) the product dispenser. The reporting schedule is maintained in response to determining that the numbers of dispenses does not exceed the threshold. Data describing a predetermined number of dispenses available from the first roll is accessed. The reporting schedule is reset to an initial state in response to receiving the refill alert.

A dispensing profile is generated based on the expected depletion date and the numbers of dispenses, and the dispenser profile indicates a time-varying number of dispenses over a set period. The reporting schedule is adjusted based on an expected schedule of maintenance visits to the product dispenser. The product dispenser dispenses the second roll until depleted before dispensing the first roll.

Particular embodiments of the subject matter described in this specification can be implemented so as to realize one or more of the following advantages. For example, the reporting schedule of the product dispenser can be managed and adjusted to allow for (i) infrequent reporting cycles when the dispenser is full or nearly full to conserve power and reduce network traffic/bandwidth requirements (e.g., reduce the number of transmissions from the product dispenser), and (ii) more frequent reporting cycles (and/or improved predictions of) when the dispenser is in a near depletion condition. This provides maintenance personnel with time appropriate (and/or more accurate) condition information to ensure the product dispenser can be refilled before running out while still permitting the dispenser to deplete as much as possible to reduce the number of refill visits, which, as described above, can be burdensome and costly.

Further, the systems and methods described herein account for stub roll (in addition to the primary roll) capacity and use in the product dispenser to improve dispenser depletion predictions (which are based on both the primary and stub rolls) and more fully and efficiently utilize all of the available product (including both the primary and stub rolls).

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

The present disclosure generally relates to dynamically determining product use reporting schedules for dispensers and predicting product use in dispensers for more efficient use and maintenance. In some implementations, the frequency of product use reports from the dispenser are dynamically changed based on the amount and/or rate of product used (or, correspondingly, remaining). For example, if the dispenser is full then the reports are sent less frequently because the likelihood of the dispenser running out of product in the short term is remote. This reduces the processing and communication burdens on the dispenser, the network and/or reporting system (e.g., by not having to determine how much product has been used/remains and transmit that information). Thus the power consumption of the dispenser is reduced, as well as network traffic. Conversely, if the dispenser is in a near depletion state then use reports are provided more frequently as an unexpected run on the dispenser could prematurely exhaust the dispenser's towel supply—so more frequent monitoring of the dispenser's remaining product is warranted to reduce the chance of fully depleting the dispenser before the next refill.

In determining the expected depletion date of the dispenser, the size, e.g., number of dispenses available, of both the first roll in the primary roll holder roll and the second roll in the stub roll holder are accounted for. The stub roll holder is used to hold the remaining portion of the first roll from the primary roll holder when the first roll is replaced with a new roll, e.g., the dispenser is refilled—although in some implementations the stub roll holder can be used to hold a (new) roll distinct and separate from the first roll. Accounting for the number of dispenses available from the second roll in the stub roll holder, in addition to those from the first roll in the primary roll holder, increases the accuracy of predictions of when the dispenser will be depleted, as compared to only accounting for the first roll. Increasing the accuracy of such predictions can reduce the necessary number of refills (as refills are performed less frequently given that the dispenses available from the second roll are also accounted for), which reduces maintenance costs associated with unnecessary visits to the dispenser for refills/monitoring. The operation of such a dynamic product use reporting system is described in more detail below with reference to FIGS. 1A, 1B and 1C.

Figure 1A:
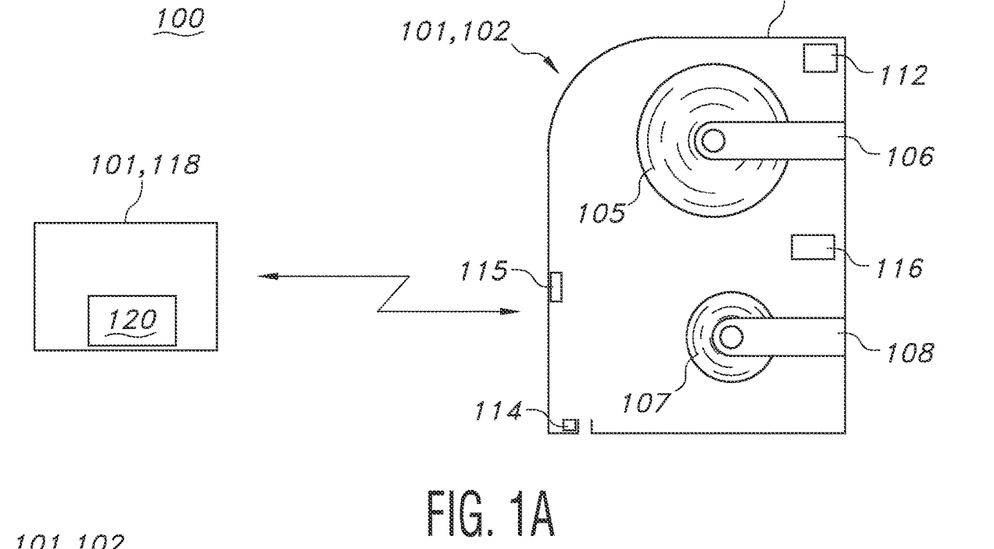
FIG. 1A is a block diagram of an example environment in which a dynamic product use reporting system can be implemented.

FIG. 1A is a block diagram of an example environment 100 in which a dynamic product use reporting system 101 can be implemented. In some implementations, the reporting system 101 includes a dispenser 102 and a data processing system 118. The environment 100 can include, for example, a semi-private or public washroom or break room or another space in which a dispenser 102 and, optionally, equipment such as toilets and/or sinks, are located. The dispenser 102 can be, for example, a hand towel dispenser 102, or a bath tissue dispenser 102, or the like.

Figure 1B:
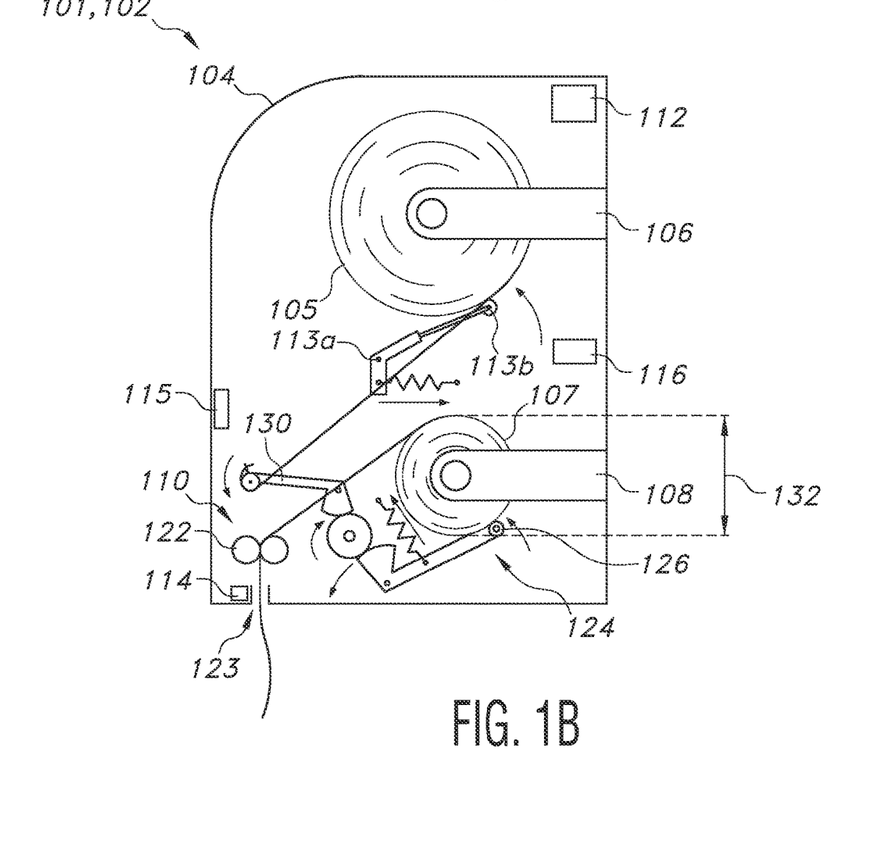
FIG. 1B is a representation of an example product dispenser in a first position.
Figure 1C:
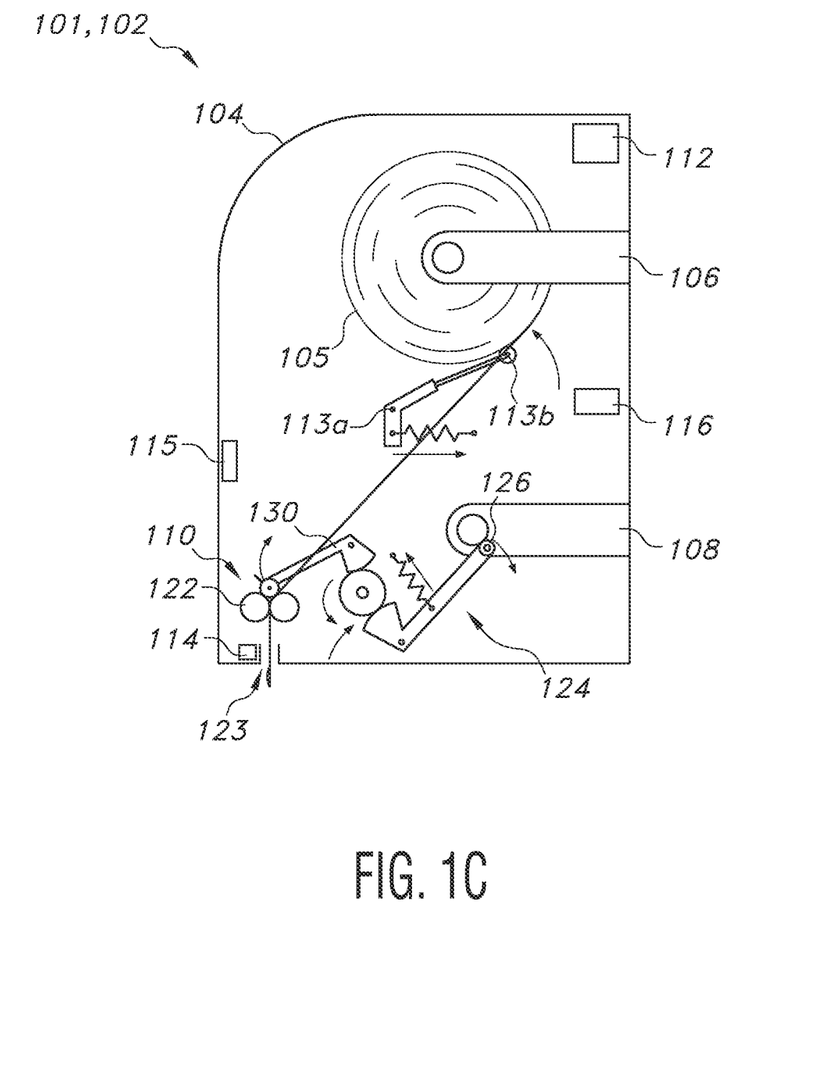
FIG. 1C is a representation of the example product dispenser in a second position.
Figure 1D:
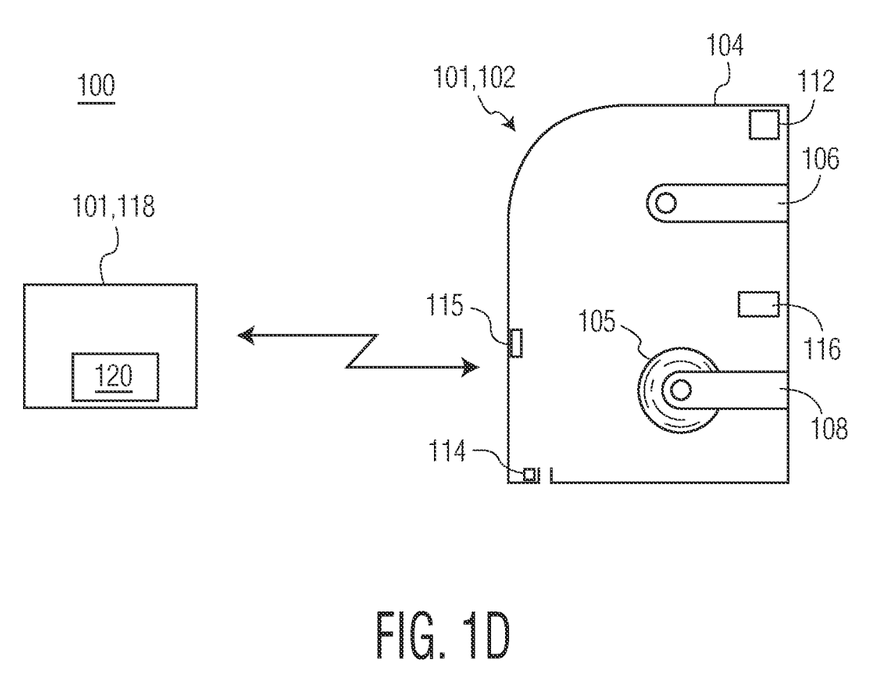
FIG. 1D is a representation of an example product dispenser with partially depleted roll.

FIG. 1B is a representation of an example product dispenser 102 in a first position and FIG. 1C is a representation of the example product dispenser 102 in a second position. In some implementations, the dispenser 102 includes a housing 104, e.g., a composite or metal body, with a primary roll holder 106 to hold a primary roll 105 and a stub roll holder 108 to hold a second roll 107. In these representations, a front portion of the housing 104 has been removed. The primary roll holder 106 and/or stub roll holder 108 may be completely or only partially within the housing 104.

The dispenser 102 also includes a dispensing mechanism 110. The dispensing mechanism 110 operates to dispense a portion of the first roll 105 and/or second roll 107 (e.g., dispense a length of towel roll for use to dry hands). In some implementations, the dispensing mechanism 110 is an electromechanical feed mechanism that, in response to a stimulus such as a user waving a hand proximate the dispenser 102, feeds a length of the first or second roll 105, 107 through an opening 123 in the housing 104 to present to the user. For example, the dispensing mechanism 110 can include a series of rollers 122 through which a portion of the first roll 105 or second roll 107 is feed such that when the dispensing mechanism 110 actuates it pulls and unwinds the roll to feed a portion of the roll to the user.

In some implementations, the dispenser 102 dispenses the second roll 107 on the stub roll holder 108 until the second roll 107 is exhausted and thereafter dispenses the first roll 105 on the primary roll holder 106. FIG. 1B depicts the dispenser 102 with a guide mechanism 124 in a first position that causes the second roll 107 to be dispensed before the first roll 105. As shown, the first guide bar 126 of the guide mechanism 124 rests against the periphery/outer diameter of the second roll 107. The position of the first guide bar 126 controls the position of the second guide bar 130 of the guide mechanism 124.

The position of the second guide bar 130 is biased based on the diameter 132 of the second roll 107 (e.g., thickness of the second roll 107 as the diameter or thickness of the second roll 107 decreases as it is used) such that when the second roll 107 is exhausted (e.g., depleted) or near-exhausted the second guide bar 130 presses a portion (e.g., tail) of the first roll 105 against one or more of the rollers 122 (as shown in FIG. 1C), which, in turn, grabs that portion thereby causing the first roll 105 to be feed through the dispenser housing opening 123 for use by a user. In other implementations, the dispenser 102 first exhausts the first roll 105 before feeding the second roll 107.

In some implementations, the dispenser 102 includes a low product alert detector 112 that generates an alert signal in response to detecting that the amount (e.g., remaining portion) of the first roll 105 is in a threshold range. The threshold range represents a predetermined amount of product (e.g., towel product) remaining on the first roll 105. For example, the threshold range may represent 0-15% of the first roll remaining or correspond to the maximum amount of the first roll 105 that can be held by the stub roll holder 108. More specifically for this example, if the first roll 105 has 500 linear feet of towel product then the threshold range would represent 0 to 75 linear feet of product remaining. The threshold range can also be represented, for example, in terms of the diameter or thickness of the first roll 105. Regardless of the metric used to represent the threshold range, when the low product alert detector 112 determines that the amount of the first roll 105 remaining is in the threshold range, it generates a low product signal, for example, upon first entering the threshold range or as long as the product is in the threshold range (e.g., on a periodic basis).

In some implementations, the low product alert detector 112 includes an arm 113 mounted on a pivot 113a on one end and rests on the periphery of the first roll 105 at the other end 113b. As the first roll 105 is used, reducing its diameter, the arm 113 pivots resulting in a change in its angular displacement. When a predetermined, e.g., user programmed, angular displacement is met, corresponding to the threshold range, the low product alert detector 112 generates the low product signal. In some implementations, the low product alert detector 112 uses an infrared or sonic detection system to measure, for example, a change in the diameter of the first roll 105, e.g., based on the distance between system sensors and the periphery of the roll 105, to determine when it should generate a signal. In some implementations, the low product alert detector 112 uses a dispensing count to determine when it should generate a signal, e.g., generate the signal after a specified number of dispenses.

In some implementations, low product alert detector 112 samples the angular displacement of the arm 113 at a first rate (e.g., every ten minutes) and changes the sampling rate to a second (e.g., more frequent) rate in response to certain conditions. For example, after a product refill, the low product alert detector 112 samples the angular displacement at the first rate of 10 minutes. And in response to determining that the angular displacement indicates that less than a threshold amount remains (e.g., less than 50% of the first roll 105 remains or a low product alert occurs) changes the sampling rate to every sixty seconds. This permits any report that is sent concerning first roll 105 usage to be at most based on 60 second old data, which is more recent and likely more accurate than a ten minute old reading (as the dispenser 102 could have been used one or more times during the nine minutes and fifty-nine seconds since the last reading, which would not be captured at ten minute intervals). Once the dispenser 102 is refilled, the sampling rate could be set back to the first (e.g., slower) rate to conserve power, as compared with the more frequent sampling of the second rate.

In some implementations, the dispenser 102 includes a dispenser counter 114 that counts a number of combined dispenses of the first roll 105 and second roll 107. For example, the dispenser counter 114 counts (e.g., increments from zero) each dispense from the dispenser 102 regardless of whether the dispensed product originated from the first roll 105 or second roll 107. In some implementations, the dispenser counter 114 is reset (e.g., to zero) each time the first roll 105 is replaced/removed/inserted and/or when the housing 104 is removed or opened/closed for the same (e.g., as alerted by the refill detector 115, as described below), or manually reset by an operator locally or remotely. For example, the dispenser counter 114 can include a proximity sensor (e.g., an infrared sensor) positioned near the housing opening 123 through which the product is dispensed to detect the presence and absence of dispensed product such that a cycle of a product presence (e.g., a dispense through the opening) followed by a product absence (e.g., a removal of the product from the opening by a user) proximate the opening 123 is one count.

The dispenser 102, in some implementations, includes a data communication device 116 (e.g., transmitter or transceiver) that operates to communicate with other devices (e.g., through wired or wireless channels or some combination thereof). For example, the data communication device 116 transmits the number of dispenses determined from the dispenser counter 114, the alert signal (e.g., when generated by the low product alert detector 112), and, in some cases, other information such as battery status (e.g., voltage or current) and dispenser error or fault codes to other devices. In some implementations, the data communication device 116 communicates information (e.g., dispense count numbers) to the data processing system 118 according to a predetermined reporting schedule (e.g., operator defined or data processing system 118 defined). However, for other information (e.g., alerts), the data communication device 116 communicates such information asynchronously (e.g., in response to alerts occurring such as a low product alert or a product refill notice or a housing opening notice). For example, in response to the low product alert signal, the data communication device 116 transmits the signal and the current dispense count to the data processing system 118. The data communication device 116 can use any number of communication protocols including, for example, WIFI, BLUETOOTH and TCP/IP to name a few.

In some implementations, the dispenser 102 includes a refill detector 115 that indicates when the first roll 105 is replaced and/or the housing 104 is opened. The refill detector 115 can be, for example, an electromechanical switch that is triggered by the housing 104 being opened or the first roll 105 being removed from the primary roll holder 106.

As described above, the system 101 includes a data processing system 118. The data processing system 118 can be part of or separate (e.g., remote) from the dispenser 102. In implementations where the data processing system 118 is remote from the dispenser 102, the system 118 and dispenser 102 can communicate across wireless or wired channels, or some combination thereof. For example, the data processing system 118 includes a transceiver 120 and microprocessor (not pictured) to facilitate such communications. In some implementations, the data processing system 118 is connected to a WAN or LAN to communicate to and with other devices such as mobile devices and/or servers.

In some implementations, the data processing system 118 receives the number of combined dispenses (e.g., dispense count of the first and second rolls 105, 107) from the data communication device 116, for example, in response to a notice from the refill detector 115 that the housing 104 has been opened, for example, to refill or replace the first roll 105 or according to a predetermined reporting schedule. The data processing system 118 determines the available dispenses for the second roll 107 based on the number of combined dispenses and a maximum number of dispenses of the first roll (e.g., which can be predetermined and accessed by the data processing system 118). In some implementations, an available dispense corresponds to one dispensed sheet of roll product. For example, the dispenser 102 is loaded with a first roll 105 in the primary roll holder 106 (e.g., there is no second roll 107 in the stub roll holder 108 because this is a new installation) and opening the housing 114 creates an alert (e.g., by the refill detector 115) that triggers the data communication device 116 to send the number of combined dispenses to the data processing system 118. If this number, for example, is 430 and the maximum number of dispenses of the first roll 105 is 500 then the data processing system 118 determines that the remaining dispenses on the first roll 105 is 70 (i.e., 500–70), which when the first roll 105 is moved to the stub roll holder 108 and becomes the second roll 107 is also the number of available dispenses for the second roll 107. Generally, in moving the first roll 105 to the stub roll holder 108, the maintenance team member servicing the dispenser 102 would also place a new first roll 105 in the primary roll holder 106.

In some implementations, the dispenser 102 permits a user to select how much product is dispensed by an actuation/dispense cycle. In this case, the report of the number of combined dispenses would include the number of dispenses at each length. For example, if there are two dispensing lengths then the report would indicate that 300 dispenses of 8 inches occurred and 130 dispenses of 6 inches occurred or 430 dispenses or 8 inches occurred, and also indicate the current dispense length setting (e.g., 6 or 8 inches). With the programmatically set length of each roll, the data processing system 118 can determine how much of the rolls have been used and how much remains. For example, if the first roll 105 has 4000 inches of product and the second roll has 500 inches of product and there were 430 reported dispenses of 8 inches then the data processing system 118 determines that 132.5 ((4000+500−3440)/8) dispenses are available.

The data processing system 118 can also determine the expected product depletion date of the first and second rolls 105, 107 based on the number of combined dispenses, the available dispenses of the second roll and the maximum number of dispenses of the first roll (e.g., the number of dispenses available from a full roll). For example, upon a dispenser refill event, the remaining portion of the first roll 105 is moved to the stub roll holder 108 and becomes the second roll 107 and a new first roll 105 is placed in the primary roll holder 106.

As described above, the data processing system 118 determines the number of available dispenses of the second roll 107 and accesses the number of dispenses available from the new first roll 105 (e.g., as specified in memory accessible to the data processing device 118). The data processing device 118 then determines the total number of available dispenses from the first and second rolls 105, 107, for example, by adding the number of available dispenses from the first roll 105 with the number of available dispenses from the second roll 107 to arrive at the total number of dispenses available from the dispenser 102 on a specific date and/or time (e.g., based on a real-time clock accessible to the data processing system 118). For example, if the second roll 107 has 70 available dispenses and the first roll has 500 available dispenses then the total number of available dispenses for the dispenser 102 is 570. Thus on a specific date/time the data processing system 118 determines that 570 dispenses are available.

In some implementations, the data processing system 118 is programmed with a default (initial) estimated dispensing profile that defines the estimated time rate of use of the dispenser 102. For example, the default estimated dispensing profile may specify a linear-type use profile, for example, forty dispenses per day. Or the profile may specify a time-varying use profile, for example, as shown in Table 1 below:

TABLE 1

| Daily Period | Estimated number of dispenses for Dispenser XYZ |
| --- | --- |
| 12:01 am-3 am | 7 |
| 3:01 am-6 am | 12 |
| 6:01 am-9 am | 17 |
| 9:01 am-noon | 14 |
| 12:01 pm-3 pm | 22 |
| 3:01 pm-6 pm | 25 |
| 6:01 pm-9 pm | 13 |
| 9:01 pm-12 am | 8 |

In some implementations the estimated dispensing profile can vary not only across a day (as shown in Table 1) but also across days of the week, weeks of the month, holidays, special events (e.g., a sporting event or musical concert), or some combination thereof. For example, Table 1 reflects a dispensing profile for Mondays. The dispensing profile for Tuesdays may be different such as that shown on Table 2:

TABLE 2

| Tuesday | Estimated number of dispenses for Dispenser XYZ |
| --- | --- |
| 12:01 am-3 am | 4 |
| 3:01 am-6 am | 15 |
| 6:01 am-9 am | 30 |
| 9:01 am-noon | 6 |
| 12:01 pm-3 pm | 17 |
| 3:01 pm-6 pm | 22 |
| 6:01 pm-9 pm | 9 |
| 9:01 pm-12 am | 3 |

In some implementations, based in part on the default profile, the data processing system 118 determines an expected depletion date. For example, using the daily profile specified in Table 1 and 570 available dispenses for the dispenser 102, the data processing system 118 determines:
- 118 dispenses will occur on Monday (starting at 12:01 am) leaving 452 dispenses available (570−118)
- 118 dispenses will occur on Tuesday leaving 334 dispenses available (452−118)
- 118 dispenses will occur on Wednesday leaving 216 dispenses available (334−118)
- 118 dispenses will occur on Thursday leaving 98 dispenses available (216−118)
- 98 dispenses will occur on Friday and the dispenser will run out/be fully depleted during the 6:01 pm-9 pm time period (as only 1 dispense will remain during this period and 13 dispenses are expected).

Thus the data processing system 118 determines that the expected depletion date is Friday 6:01 pm-9 pm. The data processing system 118 can communicate this information to a maintenance dashboard or otherwise alert maintenance personnel to this end so that the dispenser 102 can be refilled before running out of product.

In some implementations, the data processing system 118 dynamically adjusts the expected depletion date over time as it receives reports from the dispenser 102 concerning the number of dispenses that have occurred. For example, if at 11:59 pm on Monday, the data processing system 118 receives a report that 120 dispenses actually occurred, as opposed to the 118 expected, then the data processing system would determine that only 450 dispenses are available starting on Tuesday and continue using the estimate profile such that the 332 (450–118) dispenses are expected to be available starting on Wednesday. If, however, at 11:59 pm on Tuesday, the data processing system 118 receives a report that 130 dispenses actually occurred, as opposed to the 118 expected, then the data processing system would determine that only 320 dispenses are available starting on Wednesday, as opposed to the 332 expected. The sequence continues to iterate as updated dispense activity is reported to the data processing system 118.

In some implementations, the data processing system 118 updates the estimated dispensing profile based on received reports of actual dispensing activity. For example, the data processing system 118 determines that reported activity for the last two weeks shows higher than expected (according to the current dispensing profile) activity on Mondays and Thursdays and lower than expected activity on Sunday. As such, the data processing system 118 can update the estimated dispensing profile for prospective use using, for example, predictive modeling techniques such as neural networks, vector machines, k-nearest neighbor, regression, least squares, or Naïve Bayes algorithms, or the like. In some implementations, the data processing system 118 accesses anonymized information from a calendar or event schedule database indicating the date of certain events or activities and/or a number of persons expected to attend such events or activities. The data processing system 118 can use this information to update or otherwise adjust the estimated dispensing profile, for example, using the above techniques. For example, if calendar information indicates that there is an event on Friday next week in the proximity of the environment 100 with a higher than average number of persons attending, the data processing system 118 can adjust the profile to account for a likely higher than average number of dispenses from the dispenser 102 to account for the event.

The data processing system 118, in some implementations, changes the reporting schedule based on the estimated dispensing profile and/or the expected depletion date. As described above, the data communication device 116 sends reports to the data processing system 118 describing the number of combined dispenses (e.g., since the last refill event/housing 104 opening event or the last report) according to a reporting schedule, which can be periodic such as every day at noon or every twelve hours. Infrequent reporting reduces power demand on the dispenser 102 and network traffic. However, the tradeoff is less granular reporting as reports may only be provided, for example, daily. Thus, if reports are sent daily at midnight, the data processing system 118 has determined, e.g., based on past reports and the use profile, that the expected depletion date is Friday at 10 pm, has provided a notice to maintenance personnel that the dispenser 102 needs to be refilled before 10 pm, and there is an unusual dispensing demand on Friday morning that fully depletes the dispenser, then the dispenser 102 could run out. Further, even if a low product alert notifies maintenance personnel before full depletion, the maintenance personnel may have to rearrange the service schedule to handle this emergency, which could result in inefficiencies and additional service costs (e.g., making an out-of-routine trip to service the dispenser 102).

To help avoid such a scenario, in some implementations, the data processing system 118 changes the reporting schedule to require more frequent reporting as the dispenser 102 nears depletion (e.g., within 10 or 20% of depletion), approaches the expected depletion date and/or exceeds a dispensing count number or threshold. More frequent reporting provides up-to-date information that permits the data processing system 118 to revise the expected depletion date and use profile more often for better accuracy as depletion nears.

The trigger to cause the data processing system 118 to change the reporting schedule can be, for example, when the number of available dispenses falls below a minimum threshold or into the threshold range (e.g., the first roll 105 is nearing depletion such as only having 50 dispenses left) or, conversely, when the number of dispenses exceeds a maximum dispensing threshold, or when the expected depletion date is within a specified time frame (e.g., 36 hours). As such, when the trigger occurs, which can be programmatically set, the data processing system 118 revises the reporting schedule to cause more frequent reports, e.g., according to operator-defined instructions. For example, when a 50 remaining dispense trigger is met, the data processing system 118 adjusts the reporting schedule to require reporting every 6 hours, as opposed to daily. In some implementations, until the trigger (e.g., threshold) is reached, the data processing system 118 maintains (e.g., does not change) the current reporting schedule.

In some implementations, there can be multiple triggers, each associated with a different reporting frequency. For example, when there are 50 remaining dispenses, the report frequency is changed to 6 hours, and when there are 20 remaining dispenses, the report frequency is changed to every 30 minutes.

In some implementations, the reporting schedule is changed to account for a maintenance schedule defining when maintenance visits are planned for the product dispenser 102. The data processing system 118 can access a maintenance schedule for the dispenser 102 and align the reporting schedule to the planned maintenance visits. For example, if the maintenance schedule indicates a maintenance visit is planned for Wednesday at 2 pm, the data processing system 118 can change the reporting schedule to provide a report Wednesday morning (e.g., before the planned visit) to alert the maintenance personnel whether a refill is needed or not, this can be alternative to or in addition to changing the frequency of the reports.

In turn, the data communication device 116 receives the changed/adjusted reporting schedule from the data processing device 118 and thereafter transmits the number of combined dispenses (and any other requested or available information) according to the changed reporting schedule. In some implementations, the data processing system 118 resets the reporting schedule to the default state (e.g., an initial state such as, for example, a relatively infrequent reporting state) in response to receiving the refill alert, as this indicates that the dispenser has been replenished and is in a full (or near-full) capacity state.

Figure 2:
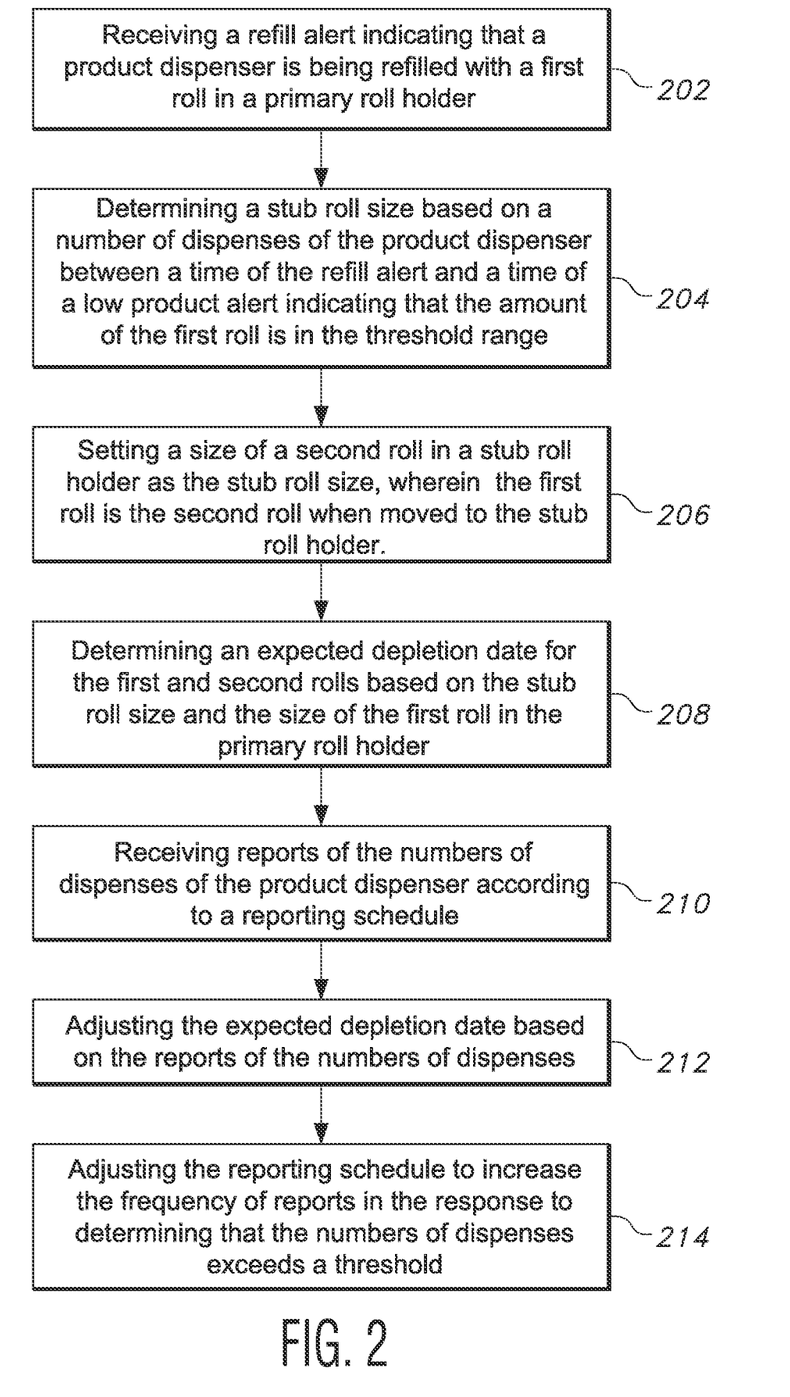
FIG. 2 is a flow chart of an example process for adjusting the reporting schedule of a product dispenser.

FIG. 2 is a flow chart of an example process for adjusting the reporting schedule of a product dispenser 102. The system 101 can, for example, perform the steps described with reference to FIG. 2.

A refill alert is received indicating that a product dispenser is being refilled with a first roll in a primary roll holder (202). For example, the refill detector 115 generates the alert, the data communication device 116 sends the alert and the data processing system 118 receives the alert.

A stub roll size is determined based on a number of dispenses of the product dispenser between a time of the refill alert and a time of a low product alert indicating that the amount of the first roll is in a threshold range (204). In some implementations, the data processing system 118 determines the stub roll size. For example, in the event of a first roll 105 being placed in the dispenser without a second roll 107, the low product alert may be set to trigger when 50 dispenses are remaining. The low product alert can include a time stamp indicating the time the alert was generated. Likewise, the refill alert can also include a time stamp indicating when the refill alert was triggered, and the report of the number of dispenses from the dispenser 102 can include time stamps denoting the time of each dispense.

The data processing system 118 can use this information to determine the size (e.g., number of dispenses remaining) on the first roll 105, which becomes the second roll 107 when placed on the stub roll holder 108. For example, if the low product alert triggers at 8 am (and is set to trigger when 50 dispenses remain), the refill alert triggers at 9:15 am, and the report of the number of dispenses (sent contemporaneously or sequentially with the refill alert) indicates that seven dispenses occurred between 8 am and 9:15 am then the data processing system 118 determines that 43 (50–7) dispenses are available on the first roll 105, which becomes the second roll 107 when placed on the stub roll holder 108. The number of dispenses represents the roll size.

A size of a second roll in a stub roll holder is set as the stub roll size (206). As described above, the first roll 105 is referred to as the second roll 107 when moved to the stub roll holder 108. In some implementations, the data processing system 118 sets the size of a second roll 107 on the stub roll holder 108 as the determined stub roll size (e.g., from step 206), and stores such information in memory.

An expected depletion date for the first and second rolls is determined based on the stub roll size and a size of the first roll in the primary roll holder (208). In some implementations, the data processing system 118 determines the expected depletion date, as described above, for example, in paragraphs 34-40.

Reports of the numbers of dispenses of the product dispenser are received according to a reporting schedule (210). In some implementations, the data processing system 118 receives reports of the numbers of (combined) dispenses from the data communication device 116, as described above, for example, in paragraphs 29 and 32.

The expected depletion date is adjusted based on the reports of the numbers of dispenses (212). In some implementations, the data processing system 118 adjusts the expected depletion date, as described above, for example, in paragraph 40.

The reporting schedule is adjusted to increase the frequency of reports in response to determining that the numbers of dispenses exceeds a threshold (214). In some implementations, the data processing system 118 adjusts the reporting schedule to increase the frequency, as described above, for example, in paragraphs 42-45.

In some implementations, the data processing system 118 adjusts the expected depletion date based on monitoring traffic in an area of the product dispenser 102. For example, a door sensor on a door to the environment 100 detects instances of the door opening and/or closing (e.g., monitors traffic) and communicates that data to the data processing system 118. In turn, the data processing system 118 uses that data to adjust the expected depletion date. For example, if the data indicate that December 24 is historically a low traffic day, then the data processing system 118 can use such data to reduce the predicted number of dispenses on December 24 going forward. For example, consider that Thursdays are typically high traffic/high dispense days. However, if the next Thursday occurs on December 24 then the data processing system 118 can reduce the number of expected dispenses for Thursday, which, in turn, may result in an adjustment to the expected depletion date (e.g., pushing the expected depletion date further out as there may be more available dispenses left after Thursday than expected due to the anticipated low dispense on December 24).

Although some of the above disclosure has focused on hand roll towel dispensers, other dispensers such as soap and facial product dispensers can benefit from the technologies herein. For example, the predicted depletion date and dynamic reporting (e.g., changing the reporting frequency) can be applied to these other dispensers. Slight changes to method 200 can make it more applicable to other types of dispensers. For example, with reference to a soap dispenser, the refill alert could be generated with a new soap cartridge is inserted into the dispenser. The expected depletion date (e.g., step 208) could be determined based on a use profile for the soap dispenser and the number of dispenses available from the dispenser. The dispenser could have a dispense counter (e.g., to measure the number of soap dispenses) and this information could be sent to the data processing system 118. In turn, the data processing system 118 could adjust the reporting frequency of the dispenser based on the number of reported dispensers and/or the use rate/use profile of the dispenser.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus or system on data stored on one or more computer-readable storage devices or received from other sources.

The term data processing apparatus or data processing system encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user computer (e.g., for purposes of displaying data to and receiving user input from a user interacting with the user computer). Data generated at the user computer (e.g., a result of the user interaction) can be received from the user computer at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:
1. A product monitoring method comprising:
receiving a refill alert indicating that a first roll in a primary roll holder has been removed or a housing holding the first roll has been opened;
determining a stub roll size, by a data processing system, based on a difference between a number of dispenses available from the first roll at a time of a low product alert and a number of dispenses available from the first roll at a time of the refill alert; wherein the low product alert indicate that the amount of the first roll is in a threshold range;

setting, by the data processing system, a size of a second roll in a stub roll holder as the stub roll size, wherein the first roll is the second roll when moved to the stub roll holder;

determining an expected depletion date for the first and second rolls based on the stub roll size and a size of the first roll in the primary roll holder;

receiving reports of the numbers of dispenses of the product dispenser according to a reporting schedule;

adjusting, by the data processing system, the expected depletion date based on the reports of the numbers of dispenses; and adjusting, by the data processing system, the reporting schedule to increase the frequency of reports in response to determining that the numbers of dispenses exceeds a threshold.

2. The method of claim 1, wherein adjusting the expected depletion date comprises adjusting the expected depletion date based on monitoring foot traffic in an area of the product dispenser.

3. The method of claim 1, wherein the product dispenser dispenses from the second roll until depleted before dispensing from the first roll.

4. The method of claim 1 comprising maintaining the reporting schedule in response to determining that the numbers of dispenses does not exceed the threshold.

5. The method of claim 1, wherein determining a stub roll size comprises accessing data describing a predetermined number of dispenses available from the first roll.

6. The method of claim 1 comprising resetting the reporting schedule to an initial state in response to receiving the refill alert.

7. The method of claim 1 comprising generating a dispensing profile based on the expected depletion date and the numbers of dispenses, wherein the dispenser profile indicates a time-varying number of dispenses over a set period.

8. The method of claim 1 comprising adjusting the reporting schedule to align with maintenance visits to the product dispenser.

9. A product monitoring method comprising:
receiving, at a data processing system, a refill alert indicating a first roll in a primary roll holder has been removed or a housing holding the first roll has been opened;

determining, at the data processing system, a stub roll size based on a number of dispenses available from the first roll at a time of a low product alert and a number of dispenses available from the first roll at a time of the refill alert;

setting, at the data processing system, a size of a second roll in a stub roll holder as the stub roll size, wherein the first roll is the second roll when moved to the stub roll holder;

determining, at the data processing system, an expected depletion date for the first and second rolls based on the stub roll size and a size of the first roll in the primary roll holder;

receiving, at the data processing system, reports of the numbers of dispenses of the product dispenser according to a reporting schedule; and adjusting, at the data processing system, the reporting schedule to increase the frequency of reports in response to determining that the numbers of dispenses exceeds a threshold.

\* \* \* \* \*